(12) United States Patent
Mintgen (10) Patent No.: US 7,900,756 B2
(45) Date of Patent: Mar. 8, 2011

(54) PUSH-TYPE GAS SPRING

(75) Inventor: Rolf Mintgen, Thuer (DE)

(73) Assignee: Stabilus GmbH, Koblenz (DE)

( * ) Notice: Subject to any disclaimer, the term of this patent is extended or adjusted under 35 U.S.C. 154(b) by 1238 days.

(21) Appl. No.: 11/357,753

(22) Filed: Feb. 17, 2006

(65) Prior Publication Data

US 2006/0186587 A1    Aug. 24, 2006

(30) Foreign Application Priority Data

Feb. 18, 2005    (DE) .......................... 10 2005 007 742

(51) Int. Cl.
    B62K 25/06    (2006.01)
(52) U.S. Cl. ........................................ 188/300; 267/120
(58) Field of Classification Search .................. 188/300,
                                188/315; 267/64.12, 120
    See application file for complete search history.

(56) References Cited

U.S. PATENT DOCUMENTS

| | | | |
|---|---|---|---|
| 3,559,188 A |   | 1/1971 | Proctor |
| 4,993,522 A | * | 2/1991 | Wagner ........................ 188/269 |
| 5,116,028 A | * | 5/1992 | Mintgen et al. ............. 267/64.12 |
| 5,615,867 A | * | 4/1997 | Bauer ......................... 267/64.11 |
| 6,557,924 B2 |   | 5/2003 | Lauderbach et al. |
| 6,942,073 B1 | * | 9/2005 | Tsai .............................. 188/300 |
| 2002/0174604 A1 |   | 11/2002 | Lauderbach et al. |
| 2003/0116897 A1 | * | 6/2003 | Knapp ....................... 267/64.12 |

FOREIGN PATENT DOCUMENTS

| | | |
|---|---|---|
| DE | 1 901 905 | 10/1964 |
| DE | 651112 | 11/1967 |
| DE | 1 980 465 | 3/1968 |
| DE | 1 992 800 | 8/1968 |
| DE | 1 901 905 | 9/1969 |
| DE | 24 53 986 | 5/1976 |
| DE | 2555907 | 6/1977 |
| DE | 33 43 049 | 6/1985 |
| DE | 10 2004 018 273 | 11/2005 |
| JP | 3-186629 | 8/1991 |
| JP | 3-189434 | 8/1991 |
| JP | 4-62439 | 5/1992 |
| JP | 127745 | 5/1995 |
| JP | 10-252805 | 9/1998 |
| JP | 10-299817 | 11/1998 |
| JP | 10-299818 | 11/1998 |
| JP | 10-325441 | 12/1998 |
| JP | 10-325442 | 12/1998 |
| JP | 2002-286080 | 10/2002 |

* cited by examiner

*Primary Examiner* — Christopher P Schwartz
(74) *Attorney, Agent, or Firm* — Cohen Pontani Lieberman & Pavane LLP (57) ABSTRACT

A push-type gas spring has a pressure tube having a pressure tube connector element for the external attachment of the push-type gas spring. The gas spring also has a piston, which is operable to slide back and forth axially in the pressure tube and has a piston rod, where the piston rod extends out of the pressure tube from a first end surface of the pressure tube and has a piston rod connector element for the external attachment of the push-type gas spring. So that tensile forces can be applied to the pressure tube connector element and the piston rod connector element, the pressure tube and the pressure tube connector element are connected to each other by a pressure tube tension element extending axially alongside the piston rod and/or the piston rod and the piston rod connector element are connected to each other by a piston rod tension element extending axially alongside the pressure tube.

23 Claims, 10 Drawing Sheets

PUSH-TYPE GAS SPRING

BACKGROUND OF THE INVENTION

1. Field of the Invention

The invention relates to a gas spring of the push type that has a pressure medium-filled pressure tube, which has a pressure tube connector element for the external attachment of the push-type gas spring; and a piston, which is operable to slide back and forth axially in the pressure tube and has a piston rod, wherein the piston rod extends out of the pressure tube from a first end surface of the pressure tube and has a piston rod connector element for the external attachment of the push-type gas spring.

2. Description of the Related Art

A push-type gas spring of this type is generally known as a means for lifting heavy objects such as the rear hatches or engine-compartment hoods of motor vehicles, etc. The push-type gas spring is a hydropneumatic adjusting element with a pressure tube, a piston with a piston rod, and connectors for attaching the push-type gas spring at one end to, for example, the chassis of a motor vehicle and at the other end to a rear hatch of the motor vehicle. A pushing force in an outward-travel direction of the pressurized gas spring is produced by the presence of a compressed pressure fluid in the pressure tube; this fluid acts with the same pressure on cross-sectional areas of the piston of different sizes.

So that a pulling force can be exerted on the connectors, pull-type gas springs are in common use. There are two different known designs for pull-type gas springs. One variant uses a piston sealed in a tube, whereas the other variant uses two piston rods of different diameter. Both variants suffer from the disadvantage of high internal friction and short life-span.

An oil-actuated cylinder with a piston rod in the form of a push-type or pull-type gas spring for limiting a drive force in a crank drive is also known. The cylinder has a complicated design, because it must be connected by an external oil connector and a pressure switching valve to a fluid reservoir and a pump, which produces the preloading pressure. A continuous process of external pressure and volume compensation takes place in the cylinder.

SUMMARY OF THE INVENTION

Proceeding from the state of the art, the present invention is based on an object of creating a push-type gas spring of the type indicated above by means of which, with a push-type gas spring of simple design, it is possible for pulling forces to be applied to the pressure tube connector element and to the piston rod connector element.

This object is accomplished according to the invention in that, in a push-type gas spring of the type indicated above, the pressure tube and the pressure tube connector element are connected by a pressure tube tension element extending axially alongside the piston rod, and/or in that the piston rod and the piston rod connector element are connected by means of a piston rod tension element extending axially alongside the pressure tube.

The invention therefore makes it possible, with only a modest amount of manufacturing effort and with use of standard commercial arrangements of pressure tubes, pistons, and piston rods, to use a pressure tube and a piston rod to apply pulling forces to the connector elements. In a push-type gas spring according to the invention, the piston rod and thus the piston are pushed into the pressure tube when the connector elements, that is, the pressure tube connector element and the piston rod connector element, are pulled apart. The relative movement between the piston rod and the pressure tube proceeds in the axial direction, that is, in the direction parallel to the center axis of the push-type gas spring. In addition to the pressure tube-piston-piston rod arrangement, which represents a hydropneumatic adjusting element in the form of a closed, maintenance-free energy-storage device, only mechanical means, e.g., in the form of tie belts or tie rods suitable for transmitting tensile forces, are required advantageously to serve as the pressure tube tension element and as the piston rod tension element, which are oriented axially, that is, parallel to the center axis of the push-type gas spring. Thus the inventive push-type gas spring is easy to manufacture and—as long as it is not subjected to excessive mechanical loads—it is also maintenance-free. The push-type gas spring has a long service life and offers a high degree of operational reliability.

The push-type gas spring has an especially high degree of mechanical stability, especially with respect to twisting around the center axis, when, in accordance with an advantageous elaboration of the invention, the pressure tube tension element and/or the pressure tube connector element and the piston rod tension element and/or the piston rod connector element rest against each other with freedom to slide in the axial direction, so that the elements can support themselves against each other without interfering with their axial movement. Components which are in contact with each other but which can still slide along each other are preferably made of different materials so as to avoid the production of noise.

The mechanical stability and endurance of the push-type gas springs can also be increased or can be additionally increased in that, in accordance with another advantageous elaboration of the invention, the pressure tube tension element has a pressure tube guide element to guide it on the piston rod tension element and/or in that the piston rod tension element has a piston rod guide element to guide it on the pressure tube tension element.

An advantageously long support distance is obtained when, according to an elaboration of the invention, the pressure tube guide element is located on the side of the pressure tube tension element facing away from the pressure tube connector element and/or the piston rod guide element is located on a side of the piston rod tension element facing away from the piston rod connector element.

According to another advantageous elaboration of the invention, the pressure tube tension element at least partially surrounds the piston rod tension element, and/or the piston rod tension element at least partially surrounds the pressure tube tension element. In a design such as this, it is possible to absorb in particular the transverse and/or torsional forces also acting on the push-type gas spring.

According to another advantageous elaboration of the invention, the pressure tube tension element fits into the piston rod tension element, and/or the piston rod tension element fits into the pressure tube tension element. This arrangement also serves to improve the effectiveness with which transverse and/or torsional forces can be absorbed.

It would be possible, for example, to attach the pressure tube tension element laterally, that is, radially, to the pressure tube. In contrast, an especially advantageous, slender design of the push-type gas spring, which occupies only a small amount of space, can be obtained when, according to another advantageous elaboration of the invention, the pressure tube tension element is connected to the pressure tube on the second end surface of the pressure tube, i.e., on the end opposite the first end surface of the pressure tube.

According to another advantageous elaboration of the invention, the piston rod tension element is connected to the end of the piston rod facing away from the pressure tube, as a result of which the piston rod is easy to manufacture, and the piston rod can be connected easily to the piston rod tension element by screwing the piston rod tension element, for example, to the freely exposed end of the piston rod.

The assembly of the push-type gas spring is advantageously facilitated when, according other elaborations of the invention, the pressure tube tension element has axially oriented sidepieces, which can be spread apart, and/or the piston rod tension element has axially oriented sidepieces, which can be spread apart.

According to another advantageous elaboration of the invention, the pressure tube tension element or the piston rod tension element has axially oriented sidepieces, which are connected to each other at both ends. This strength-increasing measure is especially important when the sidepieces of the tension element which are not connected to each other at both ends are able to spread apart. As a result, this latter tension element can pass over the former tension element during the assembly of the push-type gas spring. In general, one of the tension elements can be advantageously designed as a closed profile, whereas the other tension element can be designed as an open profile; during assembly, a pressure tube with a piston rod can then be attached first to the tension element with the closed profile, whereupon the tension element with the open profile can be pushed into the other tension element. For this purpose, the tension element with the closed profile preferably has a width which allows the sidepieces of the other tension element to spread far apart enough that the two tension elements can be telescoped into each other without the sidepieces of the tension element with the open profile being overextended.

A pressure tube design offering especially good protection toward the outside is obtained when, in accordance with another advantageous elaboration of the invention, the piston rod tension element has an outer tube which surrounds the pressure tube. This makes it possible in addition to obtain a very short push-type gas spring with connector elements on the sides.

It is especially advantageous, according to an elaboration of the invention, for the outer tube to have an axially oriented opening, through which the pressure tube connector element passes. The opening is preferably in the form of a slot, and the pressure tube connector element is guided along one edge of the opening.

It is conceivable that the pressure tube tension element could be connected directly to the pressure tube by means of, for example, a weld or adhesive bond. It is quite advantageous, however, especially because it allows for a variable adaptation to various pressure tubes which might be used, when, according to another elaboration of the invention, the end of the pressure tube tension element opposite the pressure tube connector element is connected to a pressure tube receptacle.

In a corresponding manner, the connection of the piston rod tension element to the piston rod can also be designed to be variable, when, according to another advantageous elaboration of the invention, the end of the piston rod tension element opposite the piston rod connector element is connected to a piston rod receptacle.

The tension elements can be produced easily and at low-cost by stamping, for example, when, according to another advantageous elaboration of the invention, the pressure tube tension element and/or the piston rod tension element each have at least one tie rod.

A variable design which can be adapted in many different ways to different pressure tubes and/or piston rods is obtained when, according to an advantageous elaboration of the invention, a positive connection is established between the minimum of one tie rod of the pressure tube tension element and the pressure tube connector element and/or the pressure tube receptacle and between the minimum of one tie rod of the piston rod tension element and the piston rod connector element and/or the piston rod receptacle. An especially simple way of realizing these connections is to use plug-in or clip-type connections.

The operational reliability and the service life of the push-type gas spring are advantageously increased when, according to an elaboration of the invention, the positive connection in question has a securing means. For example, the securing means can be an adhesive bond or a weld (e.g., a laser or ultrasonic weld), or it can even be a coating of paint. Optionally, connector elements such as screws can also be used to secure the connection.

The installation of the push-type gas spring can be simplified in an advantageous manner in that, according to another elaboration of the invention, the pressure tube connector element and the piston rod connector element have appropriate connector elements for the external attachment of the push-type gas spring.

To create a blocking device which makes it possible to achieve the satisfactory interlocking of the gas spring parts which are free to move with respect to each other, where this blocking device can be easily released and yet offers a high degree of functional reliability, a locking device which arrests the piston rod in its outward-extended position can be provided in the pressure tube.

For this purpose, the locking device can have a locking part mounted on the piston rod without freedom of axial movement, which part cooperates with a locking part mounted permanently on the pressure tube.

The locked position of the piston rod, furthermore, can be released by the relative displacement between the piston rod and the pressure tube under the action of an appropriate force.

A simple design comprises a rotatably supported locking part, formed by a cam drum, on the piston rod, which drum has cams with slanted repelling flanks. Another locking part, connected to the pressure tube, comprises a cam sleeve, provided with slanted repelling flanks and catches, and a cam crown, also provided with repelling flanks.

If the blocking action is to be possible at any desired point, the piston-cylinder unit comprising of the pressure tube, the piston, and the piston rod can have a manually actuated blocking device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

Elements in one figure which correspond to those in another are designated by the same reference numerals.

DETAILED DESCRIPTION OF THE PRESENTLY PREFERRED EMBODIMENTS

Figure 1:
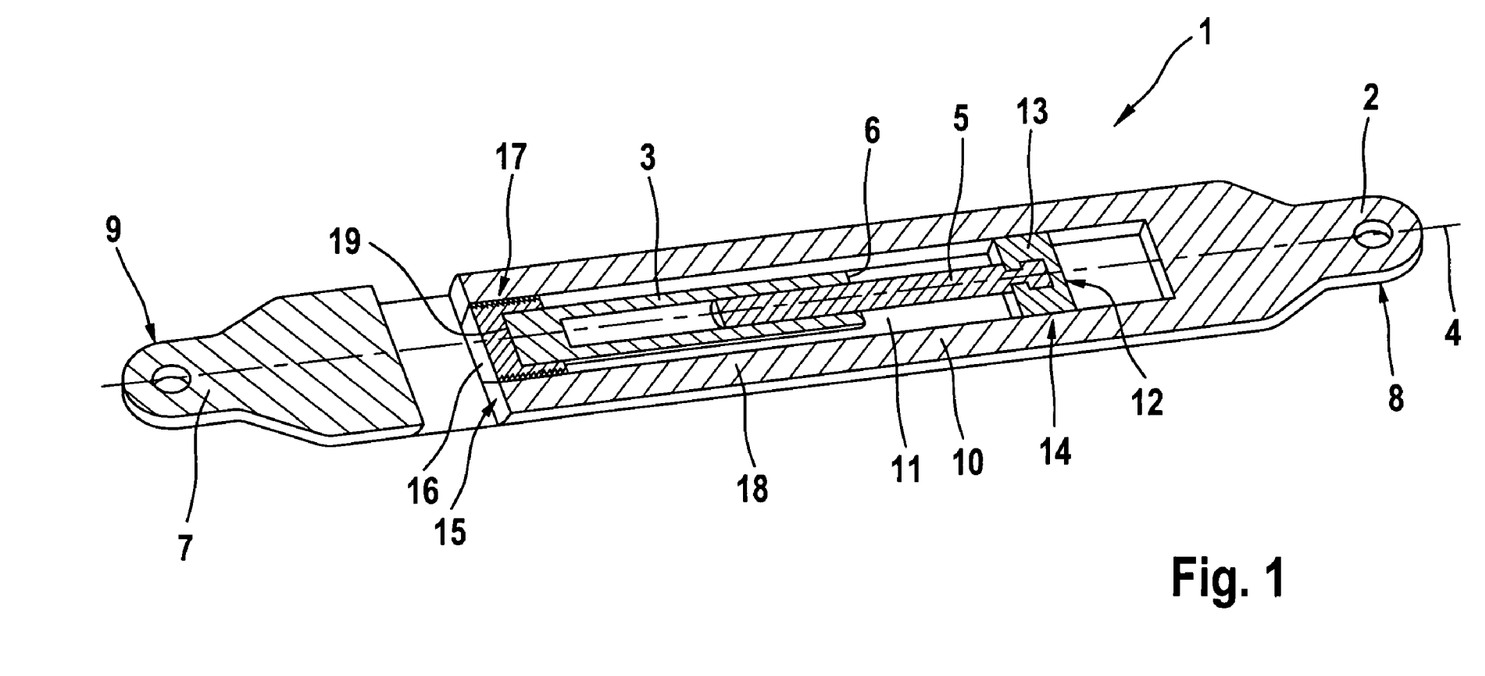
FIG. 1 shows a cut-away, perspective view of a first embodiment of a push-type gas spring of the invention.

FIG. 1 shows a cross-sectional view of a push-type gas spring 1 with a pressure tube 3, which has a pressure tube connector element 2. The pressure tube connector element 2 makes it possible for the push-type gas spring 1 to be attached externally to, for example, the chassis of a motor vehicle. A piston (not shown) with a piston rod 5 is installed in the pressure tube 3 with freedom to slide in the axial direction, that is, in the direction parallel to the center axis 4 of the push-type gas spring 1. The piston rod 5 extends out from the pressure tube 3 at a first end 6 of the pressure tube 3. A piston rod connector element 7 is provided for the external attachment of the push-type gas spring 1 to, for example, the hatch of the motor vehicle. The pressure tube connector element 2 and the piston rod connector element 7 have corresponding connector elements 8, 9 in the form of tabs, provided with openings, for the external attachment of the push-type gas spring 1.

In this exemplary embodiment, the pressure tube 3 and the pressure tube connector element 2 are connected by means of a pressure tube tension element 10 extending axially alongside the piston rod 5. The piston rod 5 and the piston rod connector element 7 are also connected by means of a piston rod tension element 11, which extends axially alongside the pressure tube 3, so that, when the pressure tube connector 2 and the piston rod connector element 7 are pulled apart, the piston rod 5 is pushed into the pressure tube 3. Pushing the piston rod 5 out of the pressure tube 3 causes the pressure tube connector element 2 and the piston rod connector element 7 to be pulled toward each other.

The piston rod tension element 11 is connected to the piston rod receptacle 13 at the end 12 opposite the piston rod connector element 7. The piston rod receptacle 13 is connected to, and forms an integral part of, a piston rod guide element 14, which guides the piston rod on the pressure tube tension element 10. Thus the piston rod guide element 14 is located on the side of the piston rod tension element 11 facing away from the piston rod connector element 7, that is, here, on the end 12 of the piston rod tension element 11 opposite the piston rod connector element 7.

The piston rod receptacle 13 allows the piston rod tension element 11 to rest with axial sliding freedom against the pressure tube tension element 10; that is, sliding movement in the axial direction can occur. The contact between the piston rod tension element 11 and the pressure tube tension element 10, however, is radial. The piston rod tension element 11 is connected to the piston rod 5 at the end of the piston rod 5 facing away from the pressure tube 3; that is, the end of the piston rod 5 facing away from the pressure tube 3 is attached by a positive connection to the piston rod receptacle 13.

The pressure tube tension element 10 is connected to the pressure tube 3 on the second end surface 19 of the pressure tube 3, i.e., the end opposite the first end surface 6 of the pressure tube 3. More particularly, the pressure tube tension element 10 is connected to a pressure tube receptacle 16 at the end 15 opposite the pressure tube connector element 2. The pressure tube receptacle 16 is connected by means of a sawtooth catch 17 to the two axially oriented sidepieces 18 of the pressure tube tension element 10, which are able to spread apart, and is thus held between the two sidepieces 18.

Materials containing lubricating additives can be used for the components which slide along each other; suitable additives include molybdenum disulfide ($MoS_2$) and polytetrafluoroethylene (PTFE).

Figure 2:
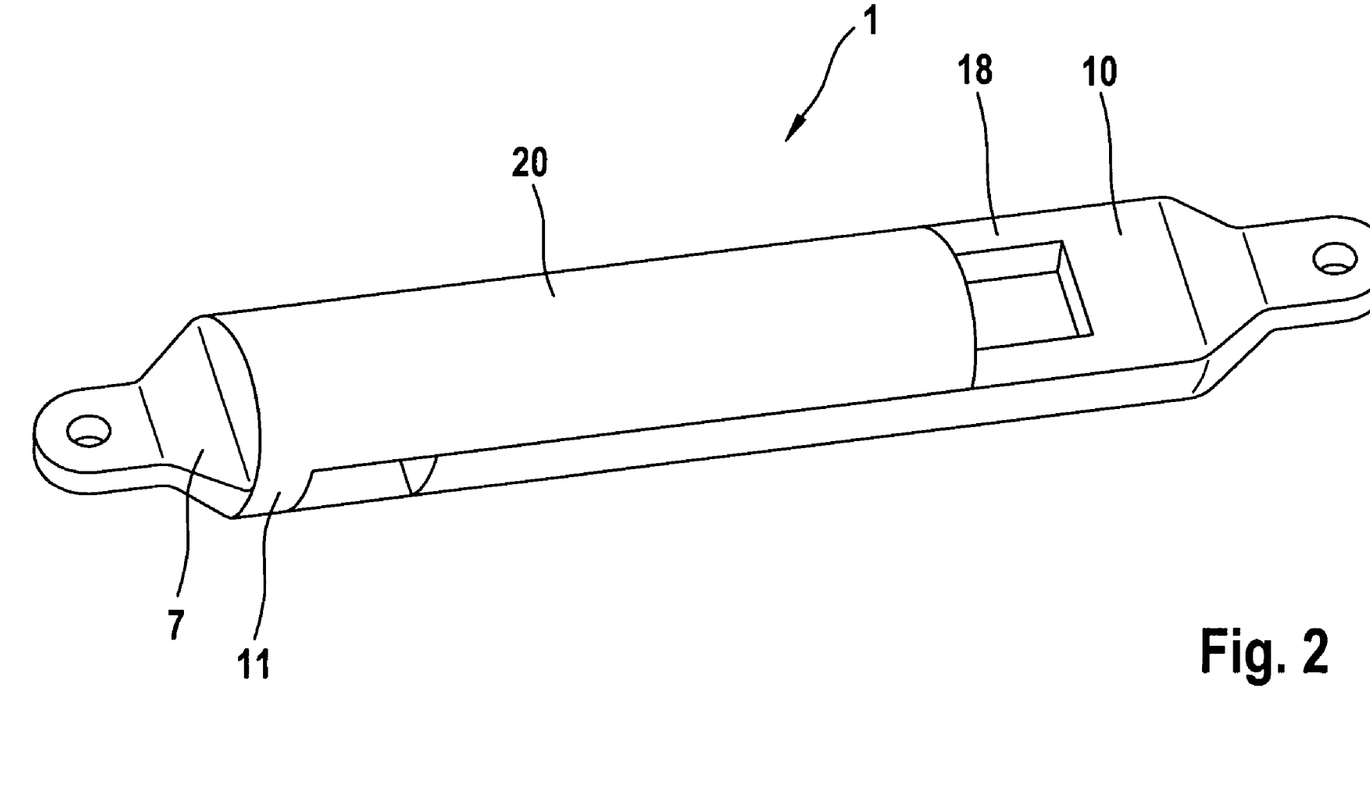
FIG. 2 shows a perspective view of a closed push-type gas spring of FIG. 1.

FIG. 2 shows a closed push-type gas spring 1. It can be seen that, in addition to the pressure tube tension element 10 with the two sidepieces 18, the piston rod tension element 11 also has two axially oriented sidepieces 20; these sidepieces 20 are connected to each other at both ends, namely, at one end by means of the piston rod receptacle 13 (see FIG. 1) and at the other end by means of the piston rod connector element 7. The sidepieces 18 of the pressure tube tension element 10 and the sidepieces 20 of the piston rod tension element 11 form the tie rods of, respectively, the pressure tube tension element 10 and the piston rod tension element 11.

Figure 3:
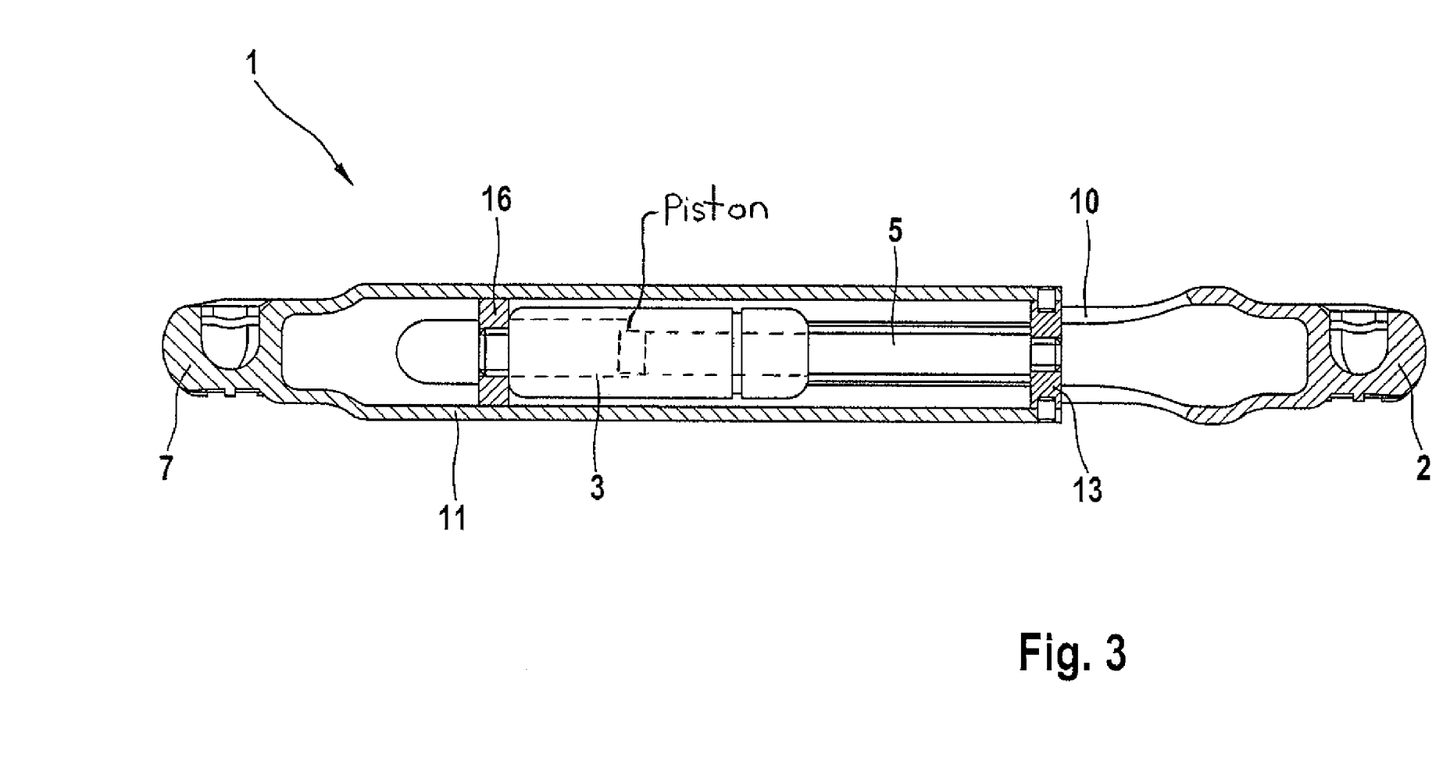
FIG. 3 shows a cross-sectional view of a second embodiment of the push-type gas spring of the invention.

A second embodiment of the push-type gas spring 1 is shown as a cross section in FIG. 3. A pressure tube 3, which has a piston with a piston rod 5, is screwed into a pressure tube receptacle 16. This pressure tube receptacle 16 is mounted at the end of a pressure tube tension element 10 opposite a pressure tube connector element 2 provided for the external attachment of the push-type gas spring 1. A piston rod receptacle 13 is screwed to the end of the piston rod 5 facing away from the pressure tube 3; the piston rod receptacle 13 is mounted on the end of a piston rod tension element 11 opposite a piston rod connector element 7 for the external attachment of the push-type gas spring 1.

Figure 4:
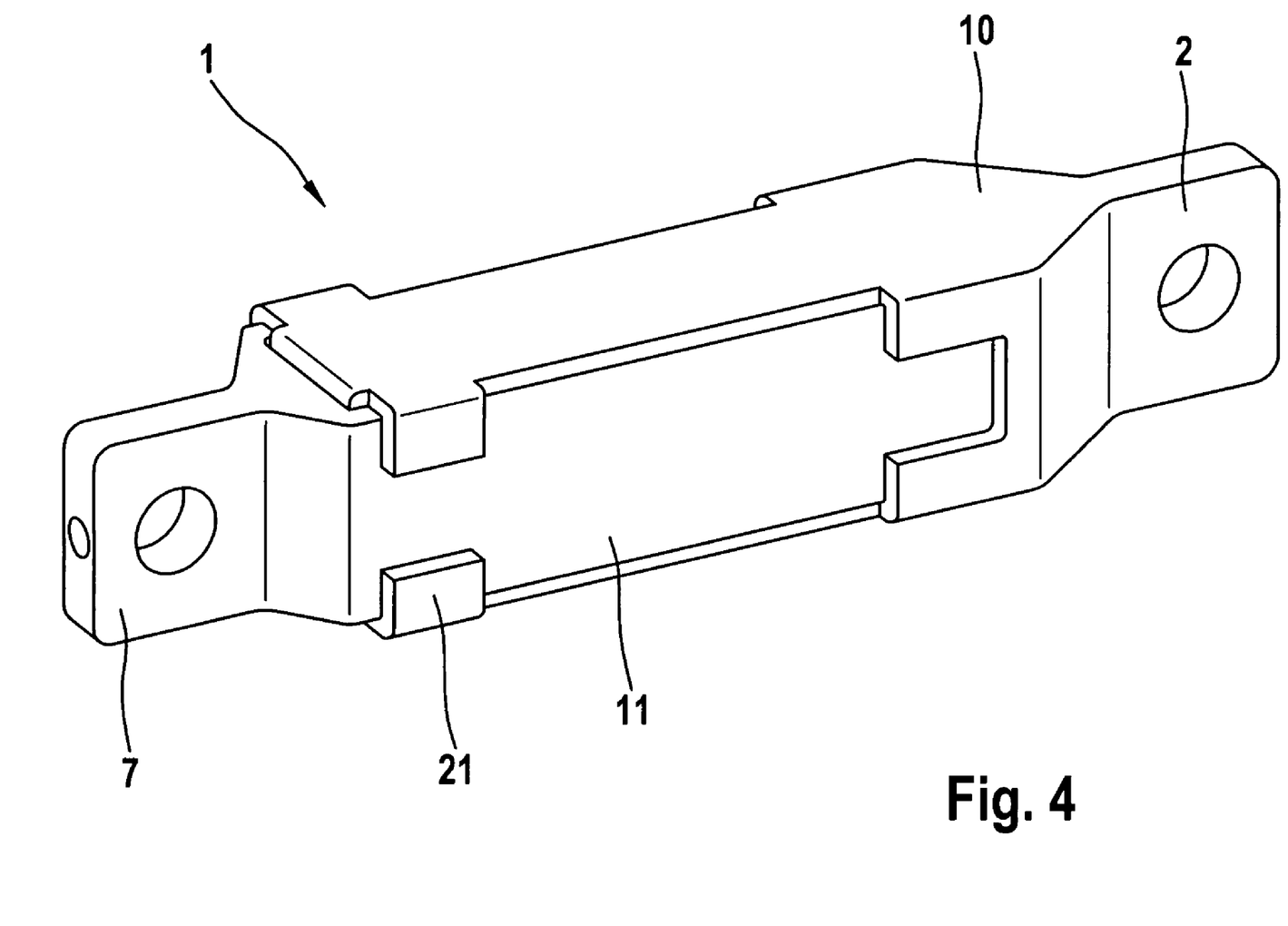
FIG. 4 shows a perspective view of a third embodiment of the push-type gas spring of the invention.

FIG. 4 shows an external view, in perspective, of a third embodiment of the push-type gas spring 1. A pressure tube tension element 10, connected to a pressure tube connector element 2, partially surrounds here, with the help of laterally bent tabs 21 on the pressure tube tension element 10, a piston rod tension element 11, connected to a piston rod connector element 7. The pressure tube with its piston and piston rod is fully encapsulated here by the pressure tube tension element 10 with the pressure tube connector element 2 and by the piston rod tension element 11 with the piston rod connector element 7.

Figure 5:
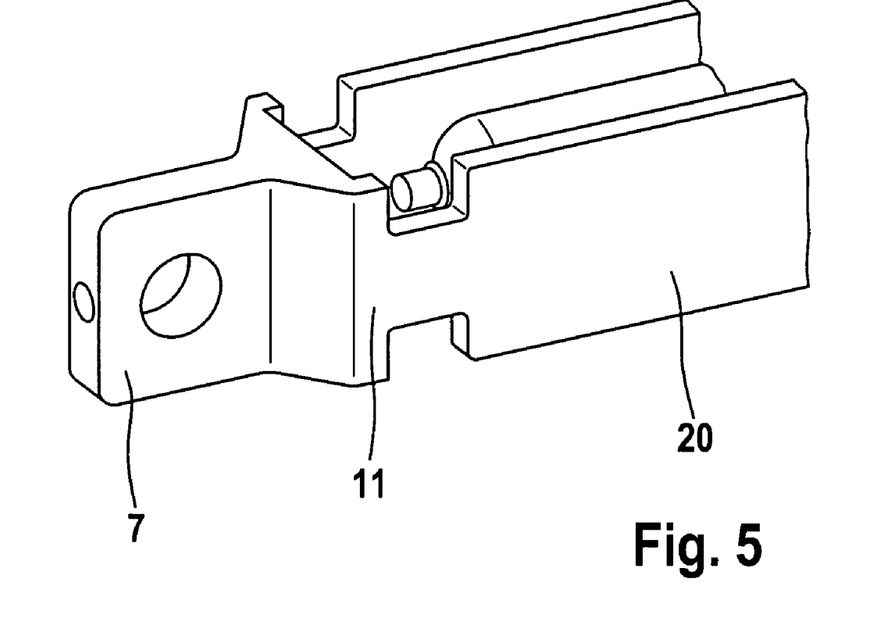
FIG. 5 shows a piston rod connector element of the push-type gas spring of FIG. 4.

The piston rod tension element 11 of the piston rod connector element 7 has a first section with two axially oriented, opposing sidepieces 20, as shown enlarged in FIG. 5.

Figure 6:
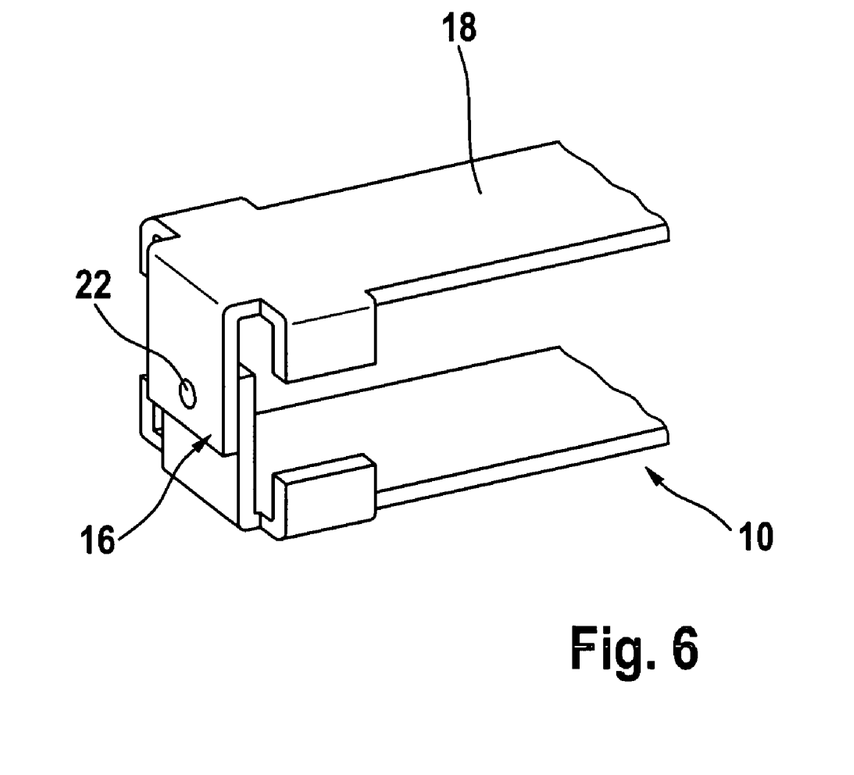
FIG. 6 shows a pressure tube receptacle of the push-type gas spring of FIG. 4.

FIG. 6 shows an enlarged view of the pressure tube tension element 10 at the end where the pressure tube is located. The pressure tube tension element has two axially oriented, opposing sidepieces 18. The sidepieces 18 are connected permanently to each other by means of a weld 22 to form a pressure tube receptacle 16.

Figure 7:
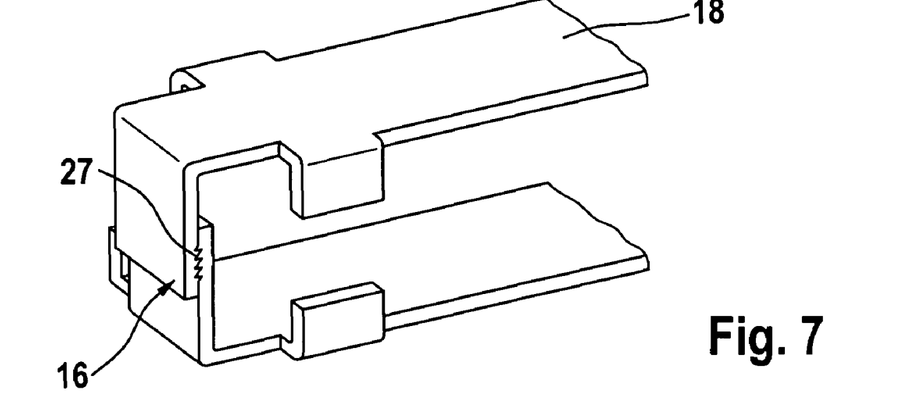
FIGS. 7-9 show three additional pressure tube receptacles.
Figure 8:
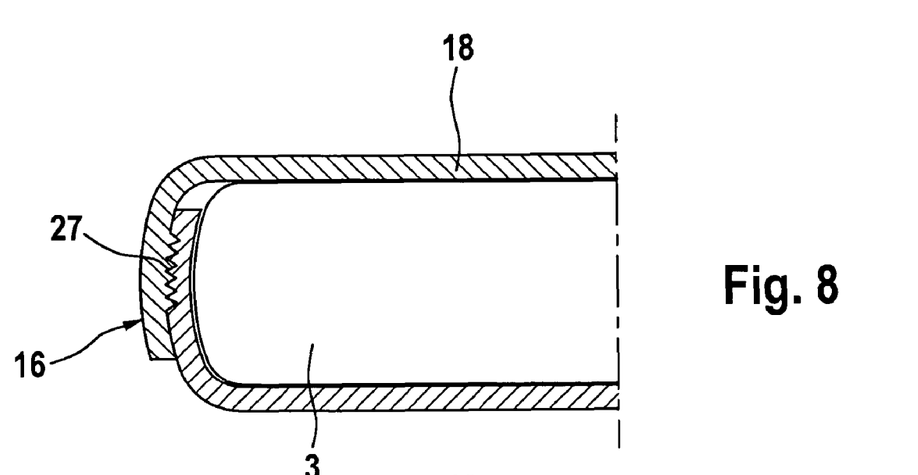
Figure 9:
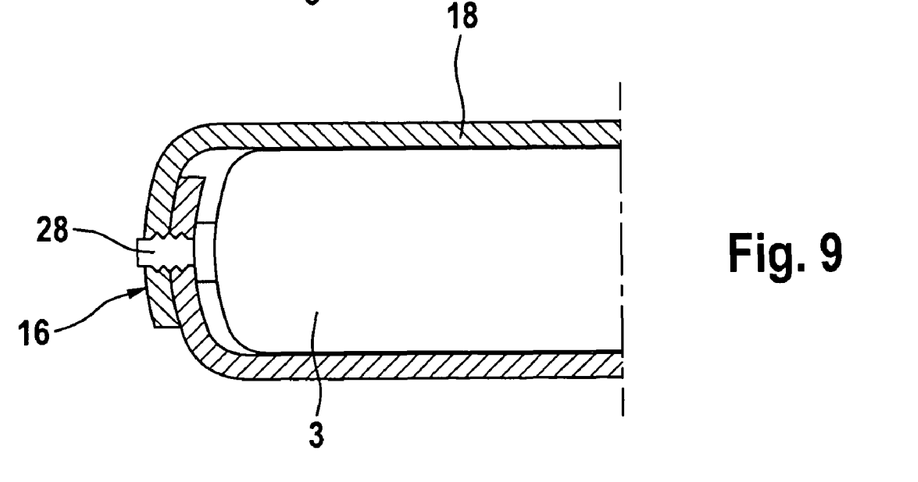

Three additional pressure tube receptacles 16 are shown in FIGS. 7-9. Two sidepieces 18 of each pressure tube receptacle are connected to each other by catches 27 (FIGS. 7, 8) or by a pinned connection 28 (FIG. 9). A pressure tube 3 also appears in FIGS. 8 and 9. In general, the pressure tube can be connected to the pressure tube tension element by a screwed joint, for example, or by a riveted joint, by a latching joint, by an ultrasonically welded joint, or by a laser-welded joint.

Figure 10:
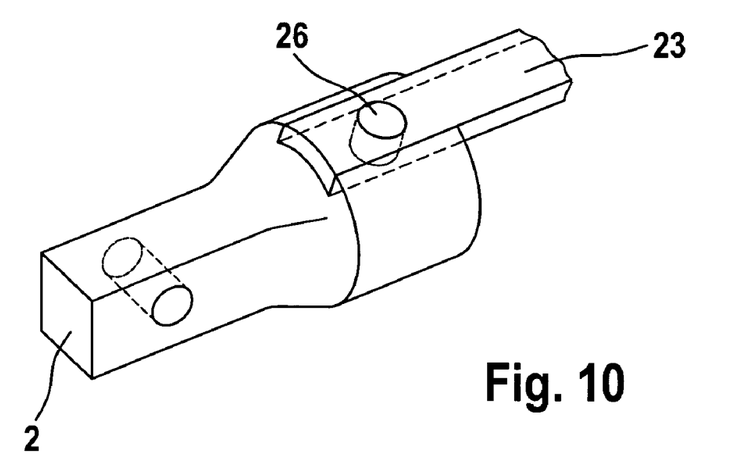
FIG. 10 shows a perspective view of a pressure tube connector element with a tie rod.
Figure 11:
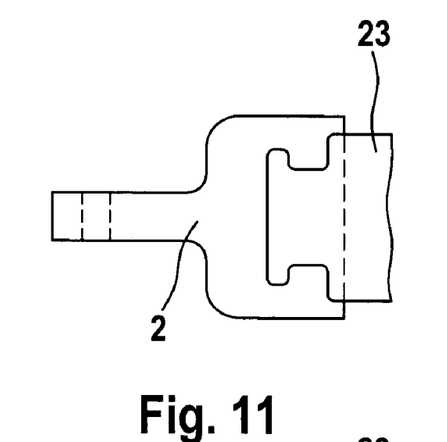
FIGS. 11-17 each show a side view of the connection of a tie rod of a pressure tube tension element to a pressure tube connector element.
Figure 12:
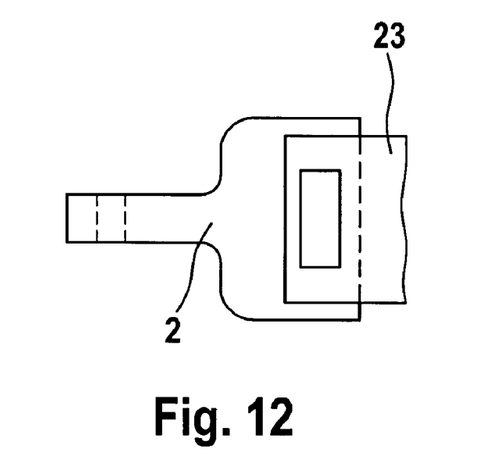
Figure 13:
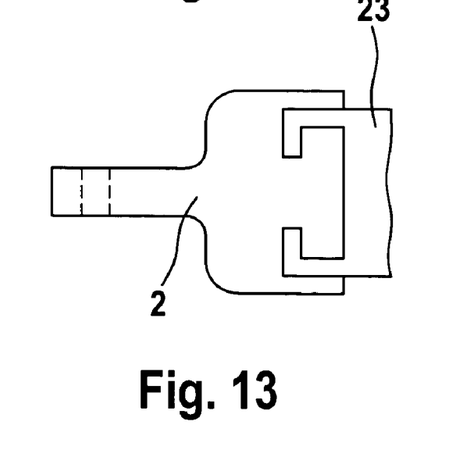
Figure 14:
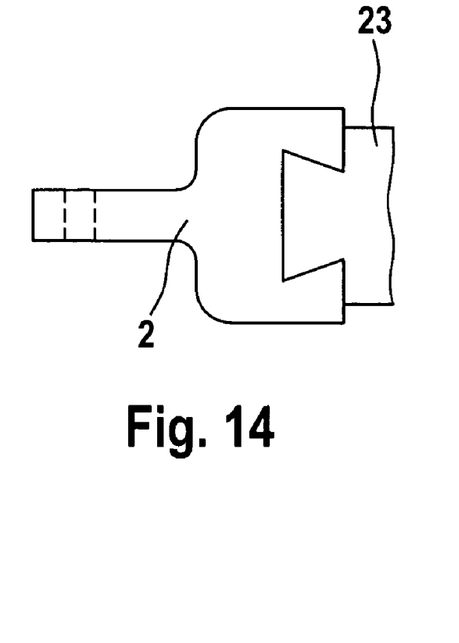
Figure 15:
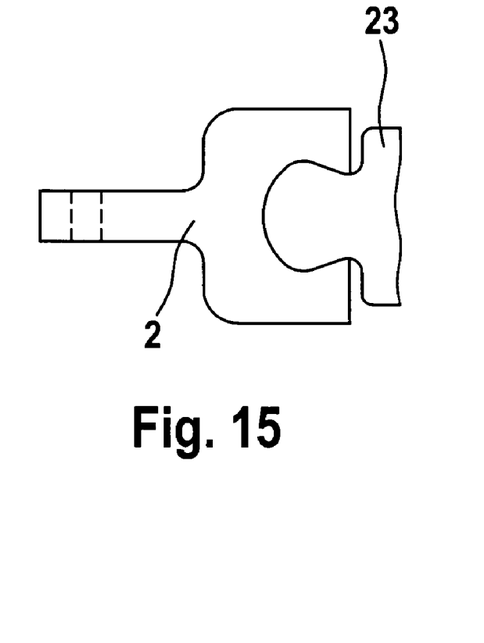
Figure 16:
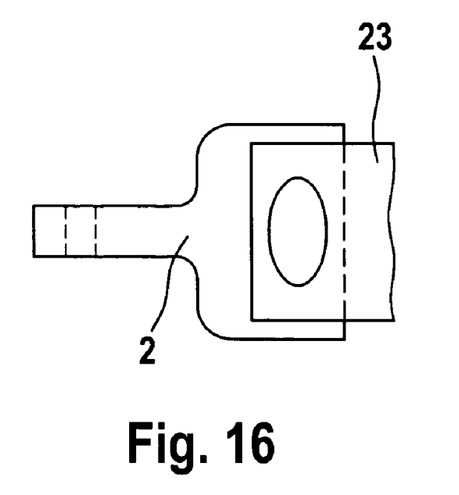
Figure 17:
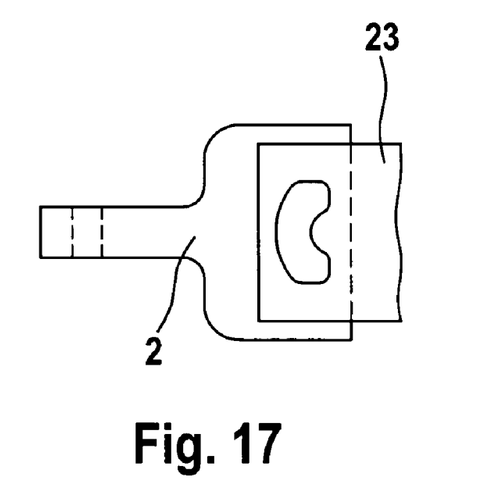

FIG. 10 shows a perspective view of a pressure tube connector element 2, connected to a tie rod 23 of a pressure tube tension element. The tie rod 23, which, for example, can be cut individually to length and thus adapted to pressure tubes of different lengths, is connected to the pressure tube connector element 2 by means of a pin 26, which serves to transmit the required force.

Various effective alternatives of a positive connection between a tie rod 23 of a pressure tube tension element and a pressure tube connector element 2 are shown in FIGS. 11-17. Each of the connections embodies a simple way of mechanically attaching the tie rod 23 to the pressure tube connector element 2. Similar types of connections can also be provided between the tie rod of the piston rod tension element and the piston rod connector element.

Figure 18:
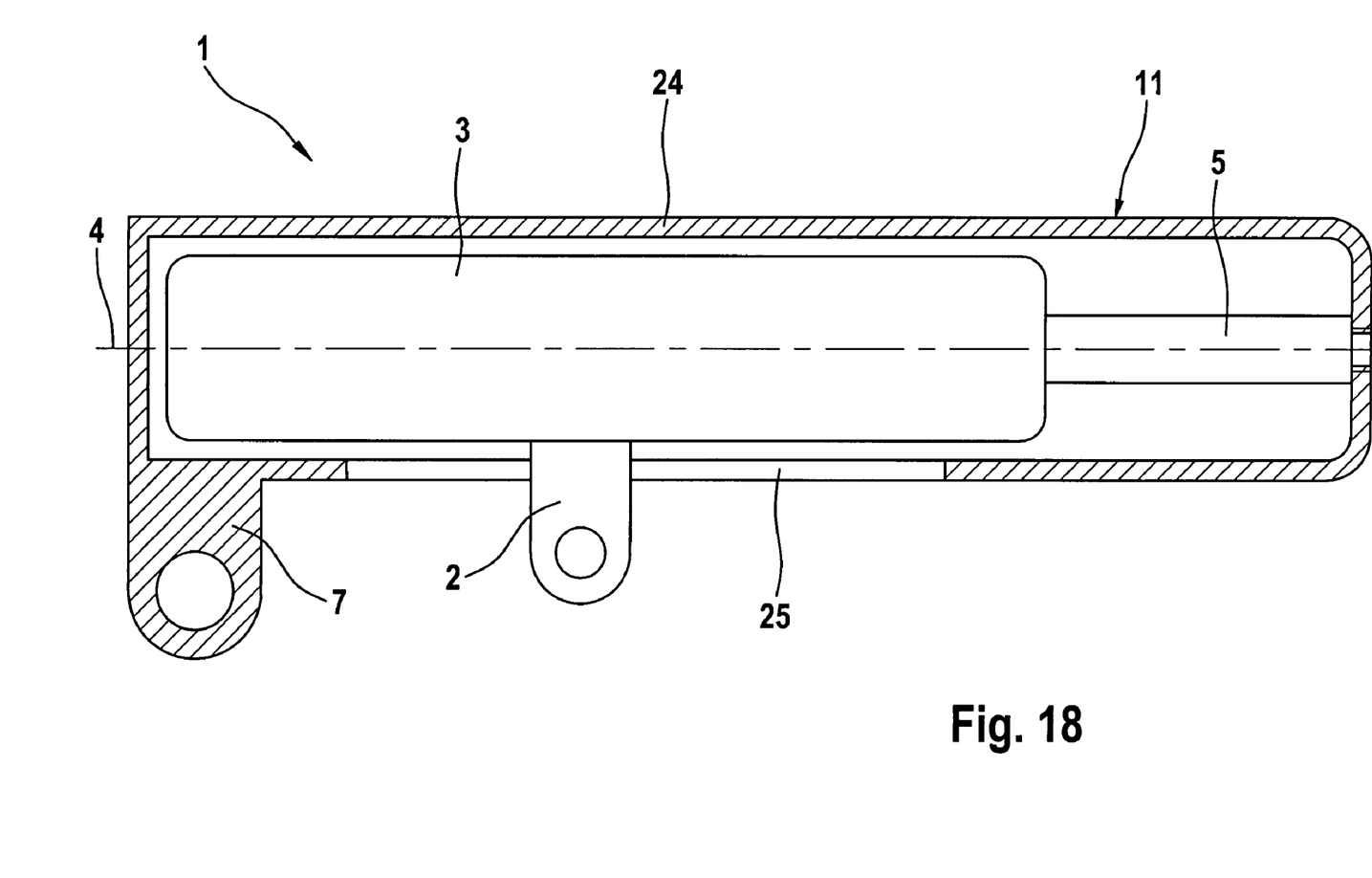
FIG. 18 shows a cross-sectional side view of another embodiment of the push-type gas spring of the invention.

FIG. 18 shows a cross-sectional side view of another embodiment of the push-type gas spring 1. The push-type gas spring 1 has a pressure tube 3, out from which a piston rod 5 extends, the piston rod having a piston rod connector element 7, which allows push-type gas spring 1 to be attached externally to the element designed to be actuated by the push-type gas spring 1. The piston rod 5 and the piston rod connector element 7 are connected to each other by means of a piston rod tension element 11, which extends axially alongside the pressure tube 3, i.e., in the direction parallel to the center axis 4 of the push-type gas spring 1.

The piston rod tension element 11 has an outer tube 24, which surrounds the pressure tube 3, where the outer tube 24 is provided with an axially oriented, slot-shaped opening 25. A pressure tube connector element 2 of the pressure tube 3 (the pressure tube connector element 2 being mounted more-or-less centrally on, and projecting radially from, the pressure tube 3), passes through the opening 25 of the outer tube 24. Via its outer tube 24, the piston rod tension element 11 is thus guided by means of the walls of the opening 25 in the outer tube 24 along the pressure tube connector element 2. The piston rod tension element 11 thus rests slidably on the pressure tube connector element 2, that is, it has the freedom to slide on the connector element 2 in the direction parallel to the center axis 4.

When the pressure tube connector element 2 and the piston rod connector element 7 are moved away from each other, the pressure tube 3 can be supported, for example, against a bottom part of the outer tube 24, and a tensile force is thus built up between the pressure tube connector element 2 and the piston rod connector element 7.

Figure 19:
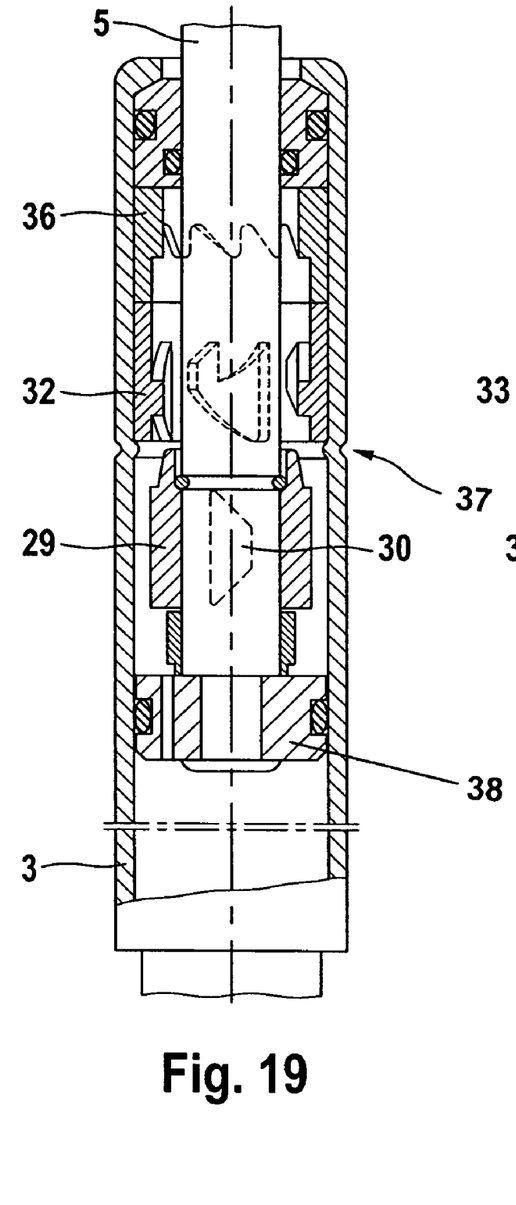
FIG. 19 shows a push-type gas spring with a locking device.
Figure 20:
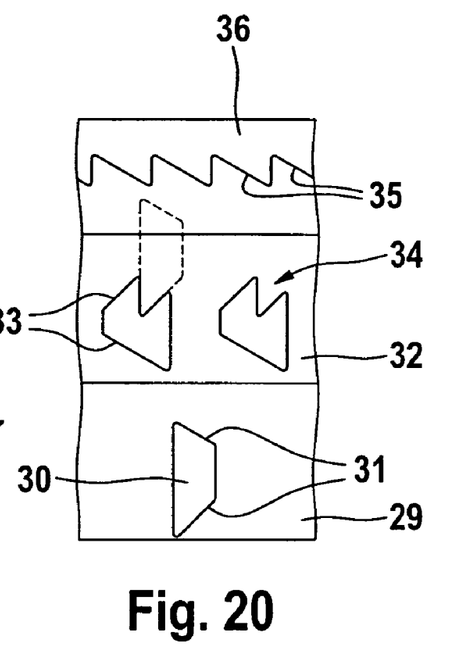
FIG. 20 shows a developed view of the locking elements of the push-type gas spring of FIG. 19.

In the case of the exemplary embodiment shown in FIGS. 19 and 20, a cam drum 29 is mounted on the piston rod 5 that is mounted on a piston 38. Cams 30 are distributed around the outer circumferential surface of the cam drum 29. The cams 30 project radially outward from the cam drum 29. The cam drum 29 is free to rotate on the piston rod 5, but is not free to move in the axial direction. A cam crown 36 and a cam sleeve 32 are mounted in the pressure tube 3 and extend through it; they are held in place in the pressure tube 3 by a pleat 37. Both the cam sleeve 32 and the cam crown 36 have control curves in the form of radially inward projecting cam surfaces. FIG. 20 shows a developed view of all these control curves.

Accordingly, the cams 30 of the cam drum 29 have repelling flanks 31. The cam sleeve 32 has repelling flanks 33 and catches 34, whereas the cam crown 36 also has repelling flanks 35.

In the case of the push-type gas spring of FIGS. 19 and 20, the repelling flanks 31 of the cam 30 of the cam drum 29 approach the repelling flanks 33 of the cam sleeve 32 during the outward travel movement of the piston rod 5. Because both sets of repelling flanks are on the same diameter, they are in each other's way. As a result of the corresponding angles of the repelling flanks 31 and 33 and as a result of the ability of the cam drum 29 to rotate on the piston rod 5, the repelling flanks slide along and past each other, and the cams 30 of the cam drum 29 move between the repelling flanks 33 of the cam sleeve 32. As a result of the gaps between the individual repelling flanks 31 in the cam sleeve 32 in the circumferential direction, the repelling flanks 31 of the cam drum 29 are pushed in a direction such that, as the piston rod 5 travels farther out, the repelling flanks 31 come into contact with the repelling flanks 35 of the cam crown 36. These repelling flanks 35 of the cam crown 36 are arranged in such a way that the cam drum 29 must rotate another step in the same direction as before. During the subsequent inward travel of the piston rod 5, the cams 30 of the cam drum 29 are no longer aligned with the gaps between the repelling flanks 33 of the cam sleeve 32. They are caught instead by the catches 34 in the cam sleeve 32, as a result of which a positive latching type of connection is ensured. In this state, the components are locked in position.

To release them, the piston rod 5 must travel outward again, and as a result the repelling flanks 31 of the cam drum 29 are rotated another step by contact with the corresponding repelling flanks 35 of the cam crown 36. When the piston rod 5 then travels inward, this change in the rotational position of the cam drum 29 allows the drum with its cams 30 and repelling flanks 31 to slide along the repelling flanks 33 of the cam sleeve 32. This makes it possible for the cam drum 29 to pass through the cam sleeve 32. Thus the locked state is released, and the hatch can be closed.

It also readily conceivable that, for example, the cam drum 29 could be mounted permanently on the piston rod 5, whereas the cam sleeve 32 and the cam crown 36 would be supported with the freedom to rotate. In addition, the control curves required for the latching function could, for example, switch positions from the rotatable part to the nonrotatable part.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A push-type gas spring for mounting between two relatively movable parts, comprising:

a pressure tube having a first longitudinal end and a second longitudinal end filled with pressure medium, the pressure tube having a first end surface;

a pressure tube connector element for mounting the pressure tube to one of the two relatively movable parts; and a piston rod axially movable in the pressure tube and extending through the first end surface of the pressure tube;

a piston rod connector element for mounting the piston rod to the other of the two relatively movable parts;

the gas spring further comprising:

a pressure tube tension element extending axially alongside the piston rod and connecting the pressure tube with the pressure tube connector element comprising at least two axially oriented sidepieces configured to spread apart, the pressure tube tension element connected to a pressure tube receptacle at the end of the pressure tube opposite the pressure tube connector element, the pressure tube receptacle connected to the two axially oriented sidepieces of the pressure tube tension element, and a piston rod tension element extending axially alongside the pressure tube and connecting the piston rod with the piston rod connector element comprising at least two axially oriented sidepieces configured to spread apart, connected to each other at one end by a piston rod receptacle and at the other end by the piston rod connector element.

2. The push-type gas spring of claim 1, further comprising a locking device in the pressure tube for locking the piston rod in an expansion position.

3. The push-type gas spring of claim 2, wherein the locking device comprises a first locking part mounted on the piston rod without freedom of axial movement, and a second, cooperating locking part fixedly mounted in the pressure tube.

4. The push-type gas spring of claim 3, wherein the locked expansion position of the piston rod can be released by a relative displacement between the piston rod and the pressure tube.

5. The push-type gas spring of claim 3, wherein the first locking part comprises a cam drum rotatably mounted on the piston rod and a plurality of cams on the cam drum, each cam having a slanted repelling frank, and wherein the second locking part comprises a cam sleeve having a plurality of slanted repelling flanks and catches, and a cam crown having a plurality of repelling flanks.

6. The push-type gas spring of claim 1, wherein at least one of the pressure tube tension element and the piston rod tension element has at least one tie rod.

7. The push-type gas spring of claim 6, further comprising a positive connection between the at least one tie rod of the pressure tube tension element and the pressure tube connector element and between the at least one tie rod of the piston rod tension element and the piston rod connector element.

8. The push-type gas spring of claim 7, wherein each of the positive connections has a locking means.

9. The push-type gas spring of claim 1, wherein the piston rod tension element comprises an outer tube surrounding the pressure tube.

10. The push-type gas spring of claim 9, wherein the outer tube has an axially oriented opening, through which the pressure tube connector element passes.

11. The push-type gas spring of claim 1, further comprising a pressure tube guide element for guiding the pressure tube tension element on the piston rod tension element.

12. The push-type gas spring of claim 11, wherein the pressure tube guide element is mounted on an end of the pressure tube tension element facing away from the pressure tube connector element.

13. The push-type gas spring of claim 1, further comprising a piston rod guide element for guiding the piston rod tension element on the pressure tube tension element.

14. The push-type gas spring of claim 13, wherein the piston rod guide element is mounted on an end of the piston rod tension element facing away from the piston rod connector element.

15. The push-type gas spring of claim 1, wherein at least one of the pressure tube tension element and the pressure tube connector element rests against at least one of the piston rod tension element and the piston rod connector element with freedom to slide axially.

16. The push-type gas spring of claim 1, wherein one of the pressure tube tension element and the piston rod tension element at least partially surrounds the other of the piston rod tension element and the pressure tube tension element.

17. The push-type gas spring of claim 1, wherein one of the pressure tube tension element and the piston rod tension element fits into the other of the pressure tube tension element and the piston rod tension element.

18. The push-type gas spring of claim 1, wherein the pressure tube has a second end surface opposite to the first end surface, and the pressure tube tension element is connected to the second end surface of the pressure tube.

19. The push-type gas spring of claim 1, wherein the piston rod has a first end disposed outside the pressure tube, and the piston rod tension element is connected to the first end of the piston rod.

20. The push-type gas spring of claim 1, wherein one of the pressure tube tension element and the piston rod tension element has at least two axially oriented sidepieces, which are connected to each other at both ends.

21. The push-type gas spring of claim 1, wherein an end of the pressure tube tension element facing away the pressure tube connector element is connected to a pressure tube receptacle.

22. The push-type gas spring of claim 1, wherein an end of the piston rod tension element facing away the piston rod connector element is connected to a piston rod receptacle.

23. The push-type gas spring of claim 1, wherein each of the pressure tube connector element and the piston rod connector element has a connector element.

* * * * *